United States Patent
Dando et al.

(10) Patent No.: US 8,301,171 B2
(45) Date of Patent: Oct. 30, 2012

(54) METHOD OF FINDING A PHYSICAL LOCATION OF A MOBILE TELEPHONE AT A GIVEN TIME

(75) Inventors: Owen Robert Dando, Edinburgh (GB); Ian Malcolm Atkinson, Edinburgh (GB); Thomas Bruce Watson Adam, Edinburgh (GB); Michael Joseph Dixon, Edinburgh (GB)

(73) Assignee: Tomtom International B.V., Amsterdam (NL)

( * ) Notice: Subject to any disclaimer, the term of this patent is extended or adjusted under 35 U.S.C. 154(b) by 1189 days.

(21) Appl. No.: 11/989,857

(22) PCT Filed: Aug. 9, 2006

(86) PCT No.: PCT/GB2006/002983
§ 371 (c)(1),
(2), (4) Date: Apr. 1, 2008

(87) PCT Pub. No.: WO2007/017691
PCT Pub. Date: Feb. 15, 2007

(65) Prior Publication Data
US 2010/0159957 A1    Jun. 24, 2010

(30) Foreign Application Priority Data
Aug. 9, 2005   (GB) .................................. 0516307.6

(51) Int. Cl.
*H04W 24/00* (2009.01)
(52) U.S. Cl. .................................. 455/456.6; 455/456.1
(58) Field of Classification Search ..... 455/456.1–456.6
See application file for complete search history.

(56) References Cited

U.S. PATENT DOCUMENTS

| | | | |
|---|---|---|---|
| 6,393,294 B1 * | 5/2002 | Perez-Breva et al. | 455/456.5 |
| 6,556,830 B1 * | 4/2003 | Lenzo | 455/450 |
| 6,804,524 B1 * | 10/2004 | Vandermeijden | 455/456.1 |
| 2002/0028655 A1 * | 3/2002 | Rosener et al. | 455/16 |
| 2002/0028681 A1 * | 3/2002 | Lee et al. | 455/456 |
| 2002/0111172 A1 * | 8/2002 | DeWolf et al. | 455/456 |
| 2003/0087647 A1 * | 5/2003 | Hurst | 455/456 |
| 2006/0030332 A1 * | 2/2006 | Carrott et al. | 455/456.1 |

FOREIGN PATENT DOCUMENTS
EP    1 304 897    4/2003
(Continued)

OTHER PUBLICATIONS
International Search Report issued Nov. 3, 2006 for International Application No. PCT/GB2006/002983.
(Continued)

*Primary Examiner* — Steven Lim

(57) ABSTRACT

A subscriber database, in at least one embodiment, stores RF level and timing advance information associated with all mobile telephones on a network. A location parameters database stores location data that associates different physical locations with RF levels/timing advance data that have been measured or inferred for those locations. The subscriber database is then interpreted for the purpose of establishing the location of a specific mobile telephone at a given time by matching the RF level/timing advance data for that specific mobile telephone against the location parameters database. This generates the location of the mobile telephone. The interpretation or querying of the subscriber database only occurs, however, when there is a request to establish the location of a specific mobile telephone, and not as an automated process applied to all mobile telephones on a network.

12 Claims, 4 Drawing Sheets

FOREIGN PATENT DOCUMENTS

| | | |
|---|---|---|
| EP | 1 555 845 | 7/2005 |
| JP | 11326484 A | 11/1999 |
| JP | 2003199143 A | 7/2003 |
| WO | WO 01/28272 | 4/2001 |

OTHER PUBLICATIONS

XP002403475—Applied Generics: "Nero 24. Fast, accurate and scalable bulk location of mobile phone subscribers"[Online] 2003, pp. 1-4, Retrieved from the Internet: URL:http://www.appliedgenerics.com/downloads/NER024-Brochure.pdf> [retrieved on Oct. 17, 2006].

XP002403476—M. Schreiner, M. Tangemann, D. Nikolai: "A new Network-based Positioning Method for Location Services in 2G and 3G Mobile Communications" IEE Conference Publication, [Online] Apr. 22-25, 2003 pp. 162-168, Retrieved from the Internet: URL:http://ieeexplore.ieee.org/iel5/9344/29685/01350177.pdf> [retrieved on Oct. 17, 2006].

* cited by examiner

Figure 3
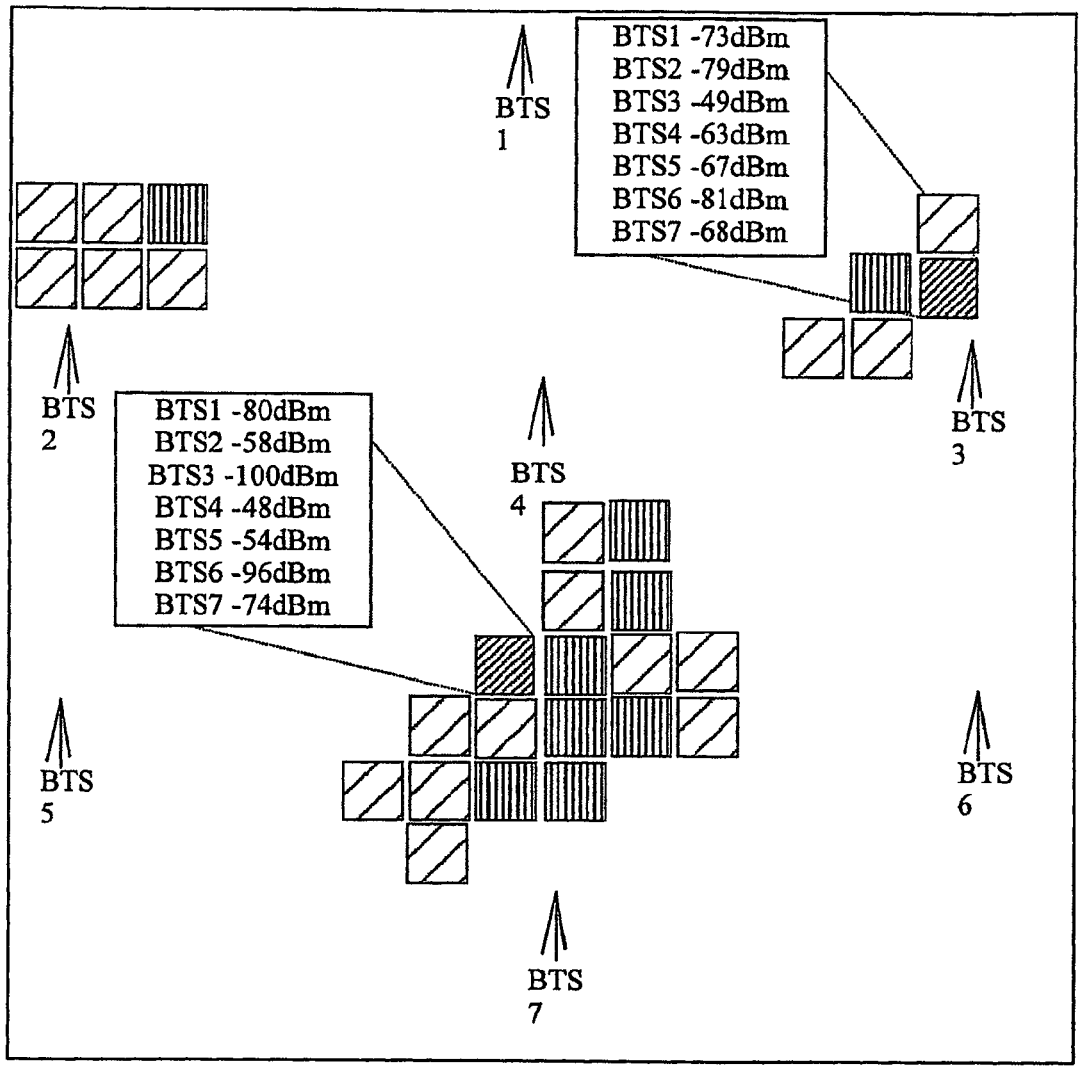
 Observations of signal strength at vehicle1 and at vehicle2 positions
 Buckets with one or more previous observations of signal strength
 Buckets where signal strength has been interpolated from neighbouring buckets

METHOD OF FINDING A PHYSICAL LOCATION OF A MOBILE TELEPHONE AT A GIVEN TIME

FIELD OF THE INVENTION

This invention relates to a method of finding a physical location of a mobile telephone at a given time.

DESCRIPTION OF THE PRIOR ART

In mobile communication systems, the ability to locate and to track mobile telephone devices, and by extension mobile subscribers, is extremely important both for governmental, regulatory and law enforcement agencies, and as an enabler of significant business opportunities.

Databases can be used to map the parameters of a mobile telephone device at a location to that location, using techniques well-known to practitioners. For example, the transmission strength of mobile base stations in the vicinity of the mobile telephone is sent to the mobile telephone network by the mobile telephone as part of the mobile telephone control information, and can be used to pinpoint the location of the phone. This transmission strength is known as the RF (radio frequency) level. The method of mapping observed RF levels of multiple base stations to the locations at which these levels are observed is based on techniques well known to practitioners.

One key problem with an RF level database, or any other characteristic database, is the construction of the database. It is costly and extremely time-consuming to construct and to maintain the database through which the location can be calculated.

One technique for constructing the database is the drive test, where an entire geographical area is manually covered by a human driver with a phone on-call, and a GPS device, with a software system logging location against time and against device parameters (as are or would be transmitted to the base transceiver station or BTS). In order to maintain an accurate database, the drive tests must then be frequently or continuously repeated. This is labour intensive and costly.

Another technique is to apply a set of assumptions about the structure of the device parameters across the location domain to bootstrap a database from a few observations; but the initial accuracy is very poor, and is heavily dependent on the accuracy of the assumptions.

It is known to use a RF profile as a 'location fingerprint'. Reference may be made to U.S. Pat. Nos. 6,782,265, 6,449, 486 and 6,393,294. Using this approach, a database can be constructed from both drive tests and predictions.

It is also known to combine the output of a traffic monitoring system and the control information of a mobile telephone network to construct and maintain, in a more automatic and hence cost effective manner, a database of locations for subscribers to the network. Reference may be made to the NERO 24™ system from the present applicant. In NERO 24, a traffic monitoring system (TMS) provides continuous, accurate locations for vehicles moving on the roads. Vehicles carry (intermittently) active mobile phones. Mobile phone control parameters observed on the mobile network are stored within a database, linking these parameters with specific locations (for example, a specific RF signal level pattern could be uniquely associated with a specific physical location). This stored information can then be used by comparing the mobile phone control parameters of mobile telephones on a network against the parameters stored in the database. This approach provides a mechanism for constructing and maintaining a database supporting subscriber location with much reduced cost and effort. It therefore enables greater adoption of location based services and the development of a range of new services previously prohibited by cost. The NERO24 system was however designed on the assumption that the location of any or all active mobile telephones on a network might at any time be required? In prior implementations, this required that the location of each device on the network would be regularly and automatically determined in a sequence or package of location requests. However, the process of actually finding the location of all mobile telephones on a network is computationally very intensive.

SUMMARY

The invention is a method of finding a physical location of a mobile telephone at a given time, the method comprising the steps of:
(a) storing, in a subscriber database, data that are derived from, or are values of, mobile telephone control parameters associated with multiple mobile telephones on a network;
(b) storing, in a location parameters database, location data that associates different physical locations with data that are derived from, or are values of, mobile telephone control parameters;
(c) interpreting the data in the subscriber database for the purpose of establishing the location of a mobile telephone at the given time by (i) using that data as a query that is run against the location parameters database in order to generate an answer that is the location of that mobile telephone and (ii) doing so only when there is an explicit request to establish the location of that one specific mobile telephone and not as part of a sequence or package of requests in relation to each of the multiple mobile telephones.

Hence, there is no requirement to find the location of all mobile telephones on a network. Instead, a location for a specific mobile telephone is established only when there is an explicit request to do so. Consequently, the cost of maintaining the subscriber database is low, because the records it holds do not need to be processed in any way unless and until the location of the relevant subscriber is queried. The term 'location of a mobile telephone at a given time' should be broadly interpreted; it does not mean the location at a precise instant but should be interpreted to cover the location at an approximate time, or over an extended time period, as well as the most recent, reliably known location.

In an implementation, at least some of the location data used to populate the location parameters database has been derived from a TMS traffic monitoring system enabling points on a road network to be associated with values of some or all of the mobile telephone control parameters. At least some of this location data may have been derived directly through measurement (for example, the control parameters could include RF signal strength; these could be directly sent to and reported back by a mobile telephone). In addition, at least some of the location data for an area extending beyond some or all roads in the road network may be derived through calculation or inference. The location parameters database can be continuously or regularly updated as it receives reports from the traffic monitoring system.

The data that populates the subscriber database (i.e. data that are derived from, or are values of, mobile telephone control parameters), can be obtained from a mobile telephone network. Because it has to be correlated/matched against data in the location parameters database, it will include at least some data of the same type as is present in the location parameters database. Hence, the data in the subscriber database can also include one or more of the following:

RF signal strength of neighbouring base transceiver stations;
RF ratios from pairs of co-located base transceiver stations;
timing advance information;
transmission error rates.

The query can trigger a match or search process to find the closest correlation between the mobile phone control parameters specified in the search query and the mobile telephone control parameters in the location parameters database. An answer to the query is the location of the mobile telephone, and that location is then stored in the subscriber database.

The mobile telephone may itself be part of a satellite navigation device equipped with a GPS receiver, such as the GO™ personal navigation device, or may communicate with that kind of device over a short range wireless network, such as Bluetooth™. GO itself may have a GSM or other cellular chipset built in for data transmissions; it may, optionally, also allow voice calls. Hence, the location parameters database can be readily constructed: mobile telephone control parameters at different physical locations (where the locations are defined by GPS position fix data) can then be stored on the device for subsequent uploading to the location parameters database (e.g. by docking the device with an interne connected PC), or sent directly over the cellular wireless network.

BRIEF DESCRIPTION OF THE DRAWINGS

The invention will be described with reference to the accompanying figures, in which:

FIG. 3 is a schematic depiction showing a location database under construction; vehicle 1 and vehicle 2 have just been located by the TMS;

DETAILED DESCRIPTION

Figure 1:
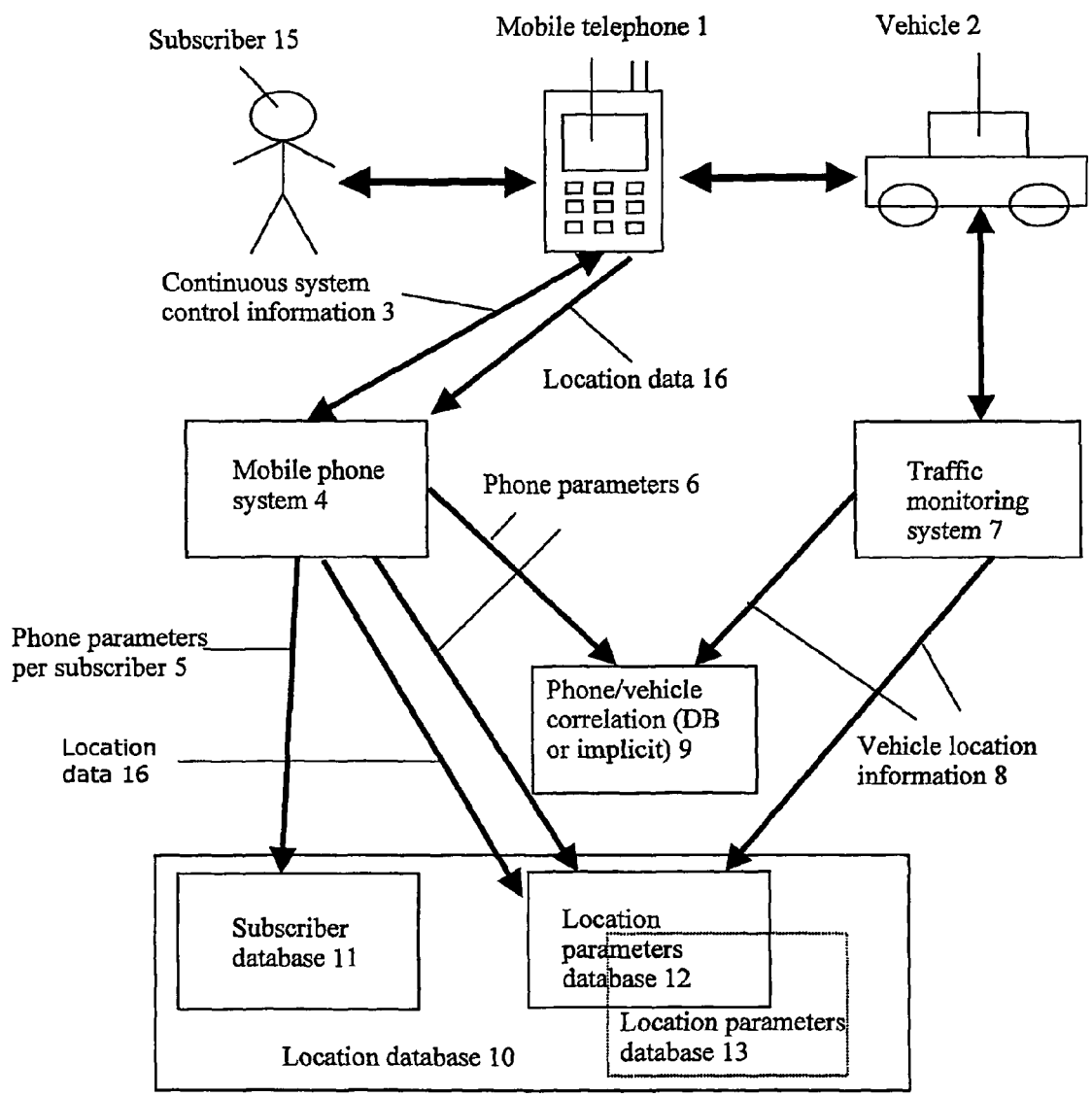
FIG. 1 is a schematic showing the information flow in a location database construction.

This section describes one implementation: a method and apparatus for combining the output of a TMS (traffic monitoring system) and the control information of a mobile telephone network to construct, maintain and query a database of mobile phone subscriber locations for subscribers to the network. The database can be queried on demand with an explicit request for the location of a specific mobile telephone: only when there is an explicit need to obtain this information is the computational overhead incurred.

The traffic monitoring system (TMS) provides continuous, accurate locations for vehicles moving on the roads. Vehicles carry (intermittently) active mobile phones. Mobile phone control parameters observed on the mobile network are stored within a database. A database (or some other functionally equivalent structure or method, which we encompass within the term 'database') associates those mobile phones carried in vehicles with the vehicles carrying them. The generated vehicle location information is correlated with the stored mobile phone control parameters using the identity of the mobile phone subscriber.

A database is generated in which the mobile phone control parameters serve as an index by which any mobile subscriber, given up-to-date mobile phone control parameters, can have their location calculated and reported. The subscriber having their location queried does not require to have been moving, or to have been monitored by the TMS.

In the preferred embodiment, the mobile phone system itself is used as input to the traffic monitoring system. In this embodiment, the TMS identifies which mobile phones are being carried in vehicles by observing their movement through the network. In this case, the database which correlates phones with vehicles is entirely implicit, and all mobile phones which the system concludes are being carried in vehicles can be correlated with the output of the TMS In another embodiment the TMS might be a system in which vehicles carry a global satellite positioning system receiver and a mobile phone. GPS systems are by now quite common. For example, the GO personal navigation device from TomTom International BV is a popular device. By transmitting an encoding of the vehicle location derived from the GPS over the mobile phone, vehicle locations and mobile phone parameters can be correlated and the location database can be derived. The TMS might also be a combination of any of the above embodiments.

Mobile Phone System

In a mobile phone system, subscribers carry handsets (i.e. mobile phones). When the subscriber initiates or receives a call or text message, radio communication takes place between the handset and a BTS (base transceiver station), the familiar mast on the modern landscape. As well as transmitting an encoding of the message passing between caller and callee, the handset and BTS transmit a large amount of control information between themselves for the purposes of reliably and efficiently supporting the call and passing it between BTSs as the subscriber moves about. This control information may contain information on the signal strength of neighbouring BTSs, timing advance information to instruct handsets further from the BTS to transmit earlier in order to match its time slot, transmission error rates and much more. Collectively we refer to these as the 'mobile telephone control parameters' (which we may abbreviate to 'phone parameters').

The implementation provides a method for automatically constructing and updating a location database from a database of mobile phone control information and the output of a TMS traffic monitoring system. It reduces the cost of location database construction and maintenance, and improves the accuracy of the resulting database. The database can be constructed to use any characteristic or combination of parameters of mobile phone control information as the key to location information. We provide two examples of databases. The first uses a combination of serving cell, timing advance, and RF levels within a zone as the location key. The second uses the ratio of RF levels from pairs of co-located BTSs to calculate bearings of the mobile phone from the base stations. Pairs of these bearings are then triangulated to generate a location for the mobile phone. While neither form of location database is novel, the problem of constructing and querying the database has until now made the form of location database itself moot. But with our method for constructing a database, we see that there are concrete instances of location databases constructed and queried using the method, which provide reliable and accurate location services.

For any chosen location database technique, the relevant mobile phone control parameters are captured and correlated with the position of the moving vehicles output by the TMS (Traffic Monitoring System, defined below). Consequently the location database is populated with data defining location mappings for all points on the road network. Where the road network is not extremely sparse, this provides a dense enough initial population of the location database to allow for location of mobile devices to within a few hundred meters. The precise accuracy depends upon the traffic monitoring system and the road network, as well as upon the chosen location database technique.

Where the phone parameters for a particular location have been discovered, the parameters for an extended area can become known, or can be calculated. This depends on the location parameters used, for instance with the ratio database (see below) the ratio at all points on a radius from any BTS is the same. So given the ratio at such a point (via TMS and phone parameters) the database can encode it for the entire radius line. In an RF level database a degree of interpolation can be carried out, by applying knowledge of the rate of signal decay with distance from the source, to estimate signal strengths at points other than those where they have been directly observed and fixed by the TMS. See for example European Commission, Digital Mobile Radio Towards Future Generation Systems, 1996.

Often these mechanisms can be enough to produce location databases with a good estimate of the parameters over the entire geographical area, and hence provide high quality location services. The quality of the location database can be significantly increased if the TMS also includes GPS-based navigation devices operating in vehicles driving along roads in the area. These devices can provide very accurate data that links different locations to the phone parameters found at each location by the device itself (if the device is a GPS navigation device with integral mobile telephone) or by a mobile telephone that operates with the device (e.g. is connected to it over a pico-network such as Bluetooth). GPS based navigation devices are becoming increasingly common: mobile telephones that are not associated in any way with a GPS device can be located more accurately if the location database is itself made more accurate by the inclusion of phone parameter data combined with GPS derived location data, as sent from a GPS navigation device directly (if it has a data send capability) or via a connected mobile telephone.

FIG. 1 is a schematic overview of the information flow in a typical implementation. A mobile telephone 1 belonging to a subscriber 15 is active (i.e. switched on, but not necessarily making a voice call) in a vehicle 2. Mobile telephone 1 exchanges a continuous stream of control parameters 3 (RF signal strength, timing advance, transmission error rates etc.) with the mobile phone system 4. These parameters, or data derived from them, are captured and sent 6 to a phone/vehicle correlation database 9 (which may be implicit). A TMS 7 sends vehicle location information to the phone/vehicle correlation database 9. In addition, the phone parameters 6 are sent to populate a location parameters database 12, 13, which also receives vehicle location information 8. The location parameters database 12, 13 is hence automatically filled with data that associates different physical locations with the phone parameters applicable at each different physical location. If mobile telephone 1 is integrated with a GPS device or can obtain position fix data from a nearby device, it can send that position fix 16 to the location parameters database 12, 13.

Once the location parameters database 12, 13 is constructed, it is possible to query it. This is done by continuously monitoring the phone parameters 5 for all mobile telephone on the network and sending all of these to the subscriber database. There is no processing of the subscriber database 11 until there is an explicit request to find the location of a specific mobile telephone.

Traffic Monitoring System

As already indicated, the TMS traffic monitoring system 7 provides continuous vehicle location information 8 for the vehicles 2 carrying active mobile phones 1. The location information 8 and the phone parameters 6 are correlated 9 to generate the location database. While any form of TMS can be used in this arrangement, it is particularly convenient to use one which is itself based on mobile phone information. In this way, the physical complexity of the monitoring system 7 can be reduced, and much of the software infrastructure can be shared.

Mobile devices in moving traffic have two advantages over static mobile devices, in calculating their location; they are restricted to the road network, and they regularly traverse cells and timing advance zones. With the application of a sophisticated traffic model, these can be processed to generate accurate placement of vehicles on the road network, and hence at a particular geographical location, for the duration of a mobile call. This information can be used to monitor the traffic status of the road network, as described in Applied Generics U.S. Pat. No. 6,650,948, the contents of which are incorporated by reference. In addition, mobile devices that are integrated with GPS satellite navigation systems or can communicate with them over short range wireless networks, can also be used to generate accurate placement, and can return that data to a remote server.

For the purposes of the current implementation, the traffic monitoring system 7 is adapted to emit location related information 9 on each mobile subscriber 15 which it has tracked, when it ceases to track that subscriber, or periodically when it has sufficient useful information to provide. This information will include a series of fixes of the location of the mobile subscriber 15 and the time at that location. By interpolation along the traversed road segments, the system can generate a fix as frequently as every second, giving very precise location information for the location database to process.

In the case where there is doubt as to the route of a vehicle, for example after a junction where two roads diverge slowly, the traffic monitoring system 7 can attach probabilities to fixes on each of the possible routes, according to its view of the likelihood that the vehicle chose each route. The location database 10 is then free to interpret these probabilities in the way that best suits it. It may interpolate the location fix and store parameters at that location. Or it may store both possible locations, and attach probabilities itself. Or it may apply some other algorithm.

Mobile Subscriber Location Database

The mobile subscriber location database 10 is the database through which location queries are serviced. It consists of a subscriber database 11, and a number of location parameters databases 12, 13. These latter are controlled by a database manager. The location database is continually updated as it receives reports from the TMS about the locations of vehicles and correlates these with the phone parameters of the mobile phones carried by the vehicles.

Subscriber Database

The subscriber database 11 contains raw records of mobile subscriber parameters, derived from the control information 3 passing between the subscriber and the network. These records are kept for all subscribers, and provide the information required to satisfy a query for the subscriber's location, if that should be made.

The cost of maintaining the subscriber database is low, because the records it holds do not need to be processed in any way unless and until the location of the relevant subscriber is queried.

Location Parameters Database(s)

A location parameters database (LPDB) 12, 13 records the particular location parameters for the geographical area to which the location database pertains. The location database may contain one or more LPDBs 12, 13. The choice of which LPDBs to maintain in a location database 10 can depend at least upon the geographical parameters of the area, the computer processing power available to each location query, the network topology and the available mobile phone network control information. The co-ordinate system used by the LPDB and the encoding within the LPDB of the appropriate mobile phone control parameters are particular to the LPDB.

We describe some examples of LPDBs.

RF Level LPDB

The control information for GSM mobile phones contains the signal strength observed at the phone for the serving BTS, and up to 6 neighbouring BTSes. The signal strength varies according to distance from the BTS, the topology of the area, the presence of buildings and for many other factors.

In the RF Level LPDB, the geographical area is subdivided into regular, small squares, called buckets. For each bucket, a record is kept of the signal strength values observed whenever a vehicle mobile phone was considered located within the bucket. A composite profile of the signal strengths within the bucket is built up.

On a location query the bucket which best matches the signal strength profile last recorded for the subscriber's phone the location of which is being queried, is returned as the bucket within which the subscriber is located.

Figure 2:
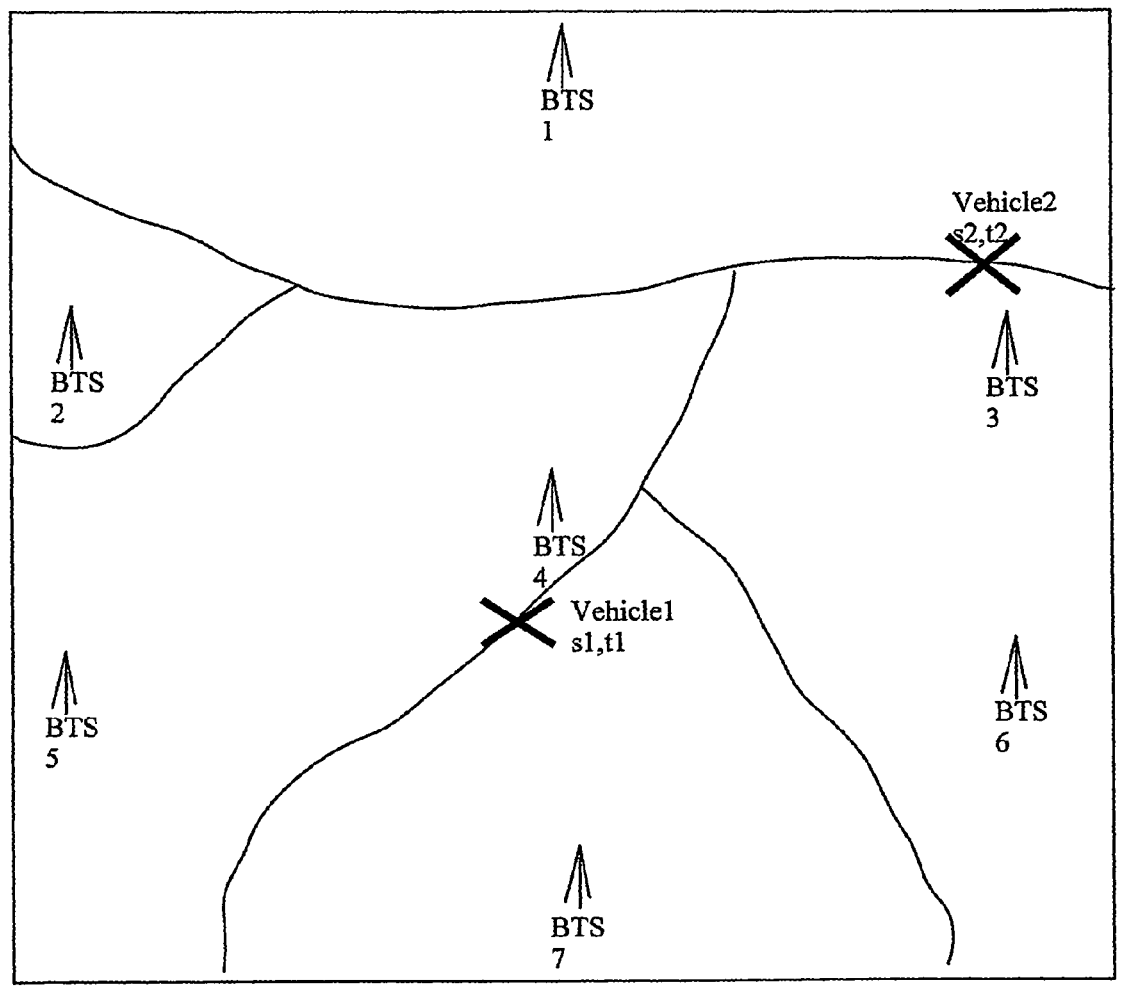
FIG. 2 is a schematic depiction showing current locations of vehicles in a Traffic Monitoring System (TMS)

FIG. 2 shows schematically the current locations of two vehicles at different locations and times (s1, t1), (s2, t2). (It is possible that t1 is the same as t2). FIG. 3 schematically illustrates the RF levels at the location of each vehicle (dense diagonal lines) and nearby buckets. The signal strength for all seven nearby BTS (BTS1 to BTS7) is shown for each vehicle location. Some buckets have a signal strength that has been directly measured (wide diagonal hatching); others are interpolated (vertical hatching).

Pairwise Ratio LPDB

In a mobile network, it is now very common for 3 BTSes to be co-located at a single site, with each oriented to provide service to a 120 degree sector of the surrounding area. Then the ratio of RF signal strength observed by a mobile phone from any pair of the BTSes is constant in the distance from the BTSes, and strongly dependent on the bearing of the phone from the BTSes. Consequently, if 2 pairs of co-located BTSes are visible to a phone, its location can be accurately triangulated. This mechanism has been described in Schreiner M., Tangemann M., Nikolai D., A New Network-based Positioning Method for Location Services, 2003. Proceedings $5^{th}$ European Personal Mobile Communications Conference, pages 162-168.

In this case, the LPDB consists of encodings of the function of RF level against bearing for all co-located pairs of BTSes. Whenever a vehicle is observed at a particular location, the bearing from the visible co-located BTS pairs is calculated, and the ratio of their signal strengths is recorded to construct or update the function values for the BTS pair.

On a location query ratios are calculated for the last RF levels observed by the mobile phone. Bearings are looked up using the functions in the LPDB, and 2 bearings are triangulated to derive the location of the mobile phone, and hence the subscriber.

Location Querying

Figure 4:
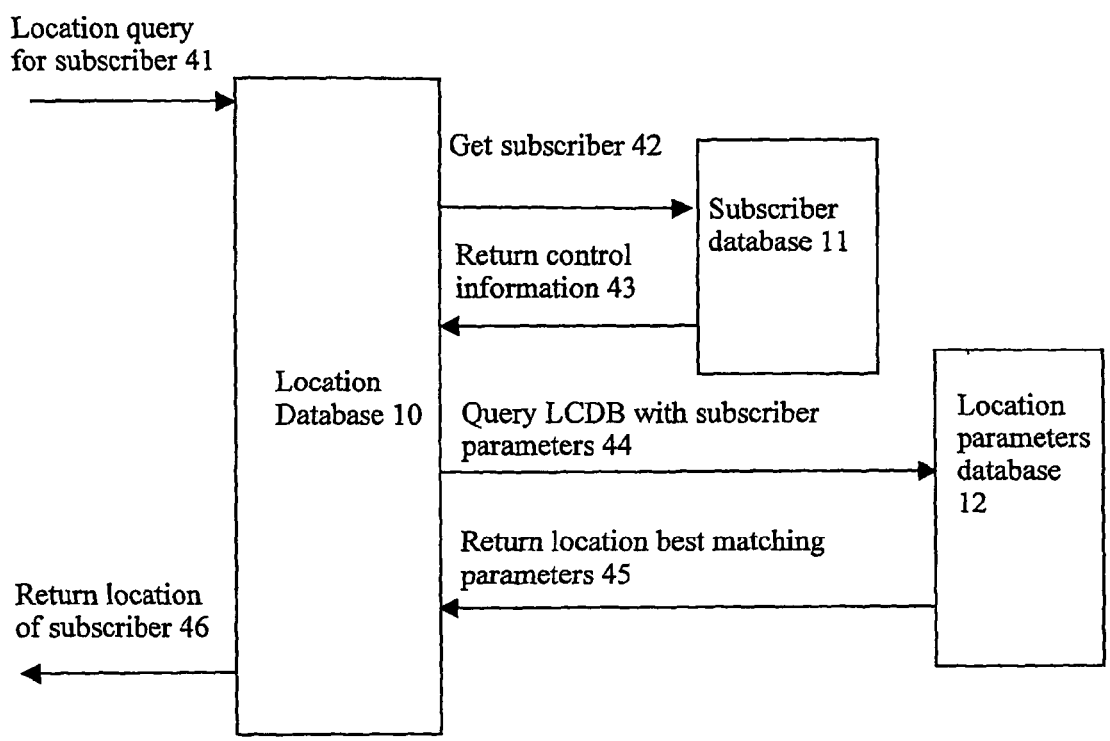
FIG. 4 shows the flow involved in querying the location of a subscriber.

To conclude, we show how the constructed location database 10 is used to discover the location of an arbitrary mobile subscriber 15 using mobile telephone 1. Until this point, major computation costs have been avoided, and we only now need to incur the cost of computing the location of the particular subscriber 15 because it has been explicitly requested. Typically the matching of parameters in the LCDB involves some costly calculation, inexact matching and/or search. FIG. 4 shows the query flow. It starts with an explicit location query 41 for a specific subscriber. Unlike earlier systems, there is no automatic querying of all subscribers. This keeps the computational overhead in generating the subscriber database low. The location query 41 is sent to a location database 10 that captures the locations of all subscribers whose location has been determined. Location database 10 sends an instruction 42 to the subscriber database 11, asking for the return of the control parameters (e.g. RF levels, timing advance etc.) for that specific subscriber (or more exactly his mobile telephone) at that time (typically the most recent record). That information 43 is returned. That information is then sent as a query 44 to the location parameters database 12, which looks for the closest match in its database. The closest match will be linked to a unique location; that location is then returned 45 to the location database 10, which in turn provides 46 the location of the subscriber at a given time to whatever service is seeking it. There will inevitably be some latency in the system so that the location returned to the service will typically be the last reliably known location of that subscriber.

The invention claimed is:

1. A method of finding a physical location of a mobile telephone at a given time, the method comprising:

storing, in a subscriber database, data that are derived from, or are values of, mobile telephone control parameters associated with multiple mobile telephones on a network;

storing, in a location parameters database, location data that associates different physical locations with data that are derived from, or are values of, mobile telephone control parameters, wherein at least some of the location data has been derived from a traffic monitoring system enabling points on a road network to be associated with values of some or all of the mobile telephone control parameters, and wherein at least some of the location data for an area extending beyond some or all roads in the road network has been derived through calculation or inference;

interpreting the data in the subscriber database for the purpose of establishing the location of a mobile telephone at the given time by:

using that data as a query that is run against the location parameters database in order to generate an answer that is the location of that mobile telephone, and doing so only when there is an explicit request to establish the location of that one specific mobile telephone and not as part of a sequence of package of requests in relation to each of the multiple mobile telephones.

2. The method of claim 1, wherein the data that are derived from, or are values of, mobile telephone control parameters, are obtained from a mobile telephone network.

3. The method of claim 1, wherein the data that are derived from, or are values of, mobile telephone control parameters, includes the RF signal strength of neighboring base transceiver stations.

4. The method of claim 1, wherein the data that are derived from, or are values of, mobile telephone control parameters includes RF levels from pairs of co-located base transceiver stations.

5. The method of claim 1, wherein the data that are derived from, or are values of, mobile telephone control parameters includes timing advance information.

6. The method of claim 1, wherein the data that are derived from, or are values of, mobile telephone control parameters includes transmission error rates.

7. The method of claim 1, wherein the location parameters database is continuously or regularly updated as it receives reports from the traffic monitoring system.

8. The method of claim 1, wherein the query triggers a match or search process to find the closest correlation between the mobile telephone control parameters specified in the search query and the mobile telephone control parameters in the location parameters database.

9. The method of claim 1, wherein an answer to the query is the location of the mobile telephone, and that location is stored in the subscriber database.

10. The method of claim 1, wherein the traffic monitoring system includes a GPS enabled navigation device that has an integrated mobile telephone.

11. The method of claim 1, wherein the traffic monitoring system includes a GPS enabled navigation device that communicates with a mobile telephone over a short range wireless network.

12. The method of claim 1, wherein at least some of the location data has been derived directly through measurement.

* * * * *